(No Model.)  11 Sheets—Sheet 1.

W. FRIESE-GREENE.
MEANS FOR COMPOSING CHARACTERS AND PRODUCING PHOTOGRAPHIC NEGATIVES THEREFROM.

No. 602,439. Patented Apr. 19, 1898.

FIG. 1.

WITNESSES:
Fred White
Thomas F. Wallace

INVENTOR:
William Friese-Greene
By his Attorneys (No Model.)

W. FRIESE-GREENE.
MEANS FOR COMPOSING CHARACTERS AND PRODUCING PHOTOGRAPHIC NEGATIVES THEREFROM.

Patented Apr. 19, 1898.

WITNESSES:
Fred White
Thomas F. Wallace

INVENTOR:
William Friese-Greene,
By his Attorneys

(No Model.)

W. FRIESE-GREENE.
MEANS FOR COMPOSING CHARACTERS AND PRODUCING PHOTOGRAPHIC NEGATIVES THEREFROM.

Patented Apr. 19, 1898.

WITNESSES:
Fred White
Thomas F. Wallace

INVENTOR:
William Friese-Greene,
By his Attorneys
Arthur C. Fraser & Co.

(No Model.) 11 Sheets—Sheet 6.

W. FRIESE-GREENE.
MEANS FOR COMPOSING CHARACTERS AND PRODUCING PHOTOGRAPHIC NEGATIVES THEREFROM.

No. 602,439. Patented Apr. 19, 1898.

FIG.7.ᴬ

WITNESSES:

INVENTOR:
William Friese-Greene,
By his Attorneys (No Model.)   
W. FRIESE-GREENE.  
11 Sheets—Sheet 8.

MEANS FOR COMPOSING CHARACTERS AND PRODUCING PHOTOGRAPHIC NEGATIVES THEREFROM.

No. 602,439. Patented Apr. 19, 1898.

WITNESSES:
Fred White
Thomas F. Wallace

INVENTOR:
William Friese-Greene,
By his Attorneys (No Model.) 11 Sheets—Sheet 9.

W. FRIESE-GREENE.
MEANS FOR COMPOSING CHARACTERS AND PRODUCING PHOTOGRAPHIC NEGATIVES THEREFROM.

No. 602,439. Patented Apr. 19, 1898.

WITNESSES:
INVENTOR:
William Friese-Greene,
By his Attorneys (No Model.) 11 Sheets—Sheet 10.

W. FRIESE-GREENE.
MEANS FOR COMPOSING CHARACTERS AND PRODUCING PHOTOGRAPHIC NEGATIVES THEREFROM.

No. 602,439. Patented Apr. 19, 1898.

WITNESSES:
Fred White
Thomas F. Wallace

INVENTOR:
William Friese-Greene,
By his Attorneys,
Arthur E. Fraser & Co.

UNITED STATES PATENT OFFICE.

WILLIAM FRIESE-GREENE, OF LONDON, ENGLAND, ASSIGNOR TO THE AUTOMATIC PHOTO PRINTING SYNDICATE, LIMITED, OF SAME PLACE.

MEANS FOR COMPOSING CHARACTERS AND PRODUCING PHOTOGRAPHIC NEGATIVES THEREFROM.

SPECIFICATION forming part of Letters Patent No. 602,439, dated April 19, 1898.

Application filed February 25, 1896. Serial No. 580,696. (No model.)

*To all whom it may concern:*

Be it known that I, WILLIAM FRIESE-GREENE, of London, England, have invented certain new and useful improvements in setting up type or composing letters, numerals, or other characters and producing photographic negatives or transparencies therefrom and in the means or apparatus for the purpose, of which the following is a specification.

The object of this invention is to set up or compose letters, numerals, or other characters in lines and then produce or print therefrom by means of light a negative or a transparency upon a photographic plate or film.

The invention relates to a mode or process of producing a photographic negative or transparency of a number of composed lines of letters, numerals, or other characters, which mode or process consists in first setting up or composing a line by means of a number of movable strips arranged side by side and each bearing one example of every character required in type composition, then photographing the line thus composed, then setting up another line in like manner by means of the same strips and similarly photographing this line, and so on for any desired number of lines, the photographic plate or film having only a portion exposed at a time and being moved one step after each line has been photographed.

The invention provides a plurality of strips, each bearing in a straight line and in a manner capable of being reproduced photographically one example of every letter or character required in type composition, the said strips being preferably of varying width or having a longitudinal rib of varying width, such width comprising, for example, "m," "n," and "l" widths. Such strips are movably arranged side by side. A number of keys corresponding with the letters or characters on the strips are provided, as well as improved means whereby the manipulation of the keys brings the successive strips into the respective positions required to compose a line.

My invention also provides various subsidiary improvements and combinations of parts which will be fully understood from the following description and claims.

In an apparatus in which my invention is embodied there are as many movable strips of any suitable material as the maximum number of characters and spaces that will go to make up a complete line. Every strip bears one example of every letter and character that are required for producing the necessary words, &c., corresponding, in fact, with the characters in a font of type. The letters and other characters are arranged in line from end to end of the strip. The strip is preferably formed of varying width or with a longitudinal rib at back of varying width at different parts, the letters or characters of "m" width being on or in front of the widest part, those of "n" width on or in front of the next widest part, and those of narrower width on or in front of the narrowest part of the strip or rib. These strips are all arranged side by side in guides in which they are free to be moved. There is placed transversely of the strips a sheet of opaque material having a slot therein which extends across the strips and is equal in length to the line to be set up. This slot allows light to pass to the letters or characters which for the time being are in line with the slot and also enables the operator to see his work. Opposite the slotted plate in a suitable camera is a photographic plate or film which can be moved onward intermittently by any suitable means. For ordinary work it is best to have larger letters or other characters than are required on the negative or transparency and to reduce them by a lens, because in this way they are obtained sharper and clearer.

In setting up or composing a line the strips are moved in succession, so as to bring the required letters or characters for the words, &c., in line with the slot, so that the line of characters can, in fact, be read. This line is then exposed to a portion of the photographic plate or film, so that (after being developed) it is reproduced thereon in the form of a negative or transparency. Another line is next set up by means of the same strips and exposed, so as to reproduce it in turn, the photographic plate or film having been meanwhile moved the necessary distance to enable this second line to be reproduced in the proper position. The operation is repeated for as many lines as may be required.

In the accompanying drawings, which represent an apparatus constructed according to my invention, Fig. 3 is a vertical section of one of the "dash-pots" hereinafter described.

Figs. 4 to 10 are drawn to a larger scale than Figs. 1 and 2, and Fig. 3 and Figs. 11 to 17 are drawn to a still larger scale.

Figure 13:
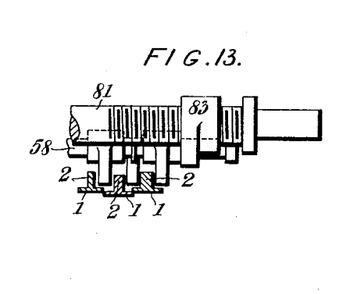
Figure 16:
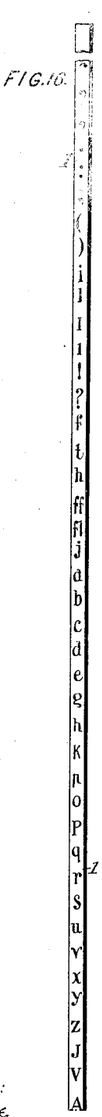
Figs. 16 and 17, both shown in two parts, are respectively a face view and a back view of one of the strips.

1 1 1 are a number of strips arranged vertically side by side, their number being equal to the maximum number of characters and spaces—say forty, for example—that will go to make up a complete line. These strips are arranged so that every alternate strip is slightly in advance of those on each side, as seen in Fig. 13, and it may overlap them. The strips are of black or other non-actinic color and each of them bears in white or actinic color one example of every letter and character that are required for producing the necessary words, &c., corresponding, in fact, with the characters in a font of type. This will be understood on reference to Fig. 16, in which, however, the characters (for convenience of illustration) are shown in black upon a white ground. Every strip has a rib 2 at the back. This rib is of varying widths. The portion of the rib from $2^a$ to $2^b$ is of "l" width and the corresponding part of the strip 1 bears the letters or characters that are of the width of an "l". The portion from $2^c$ to $2^d$ is of "n" width, and the corresponding part of the strip bears the letters or characters that are of the width of an "n," and the portion from $2^e$ to $2^f$ is of "m" width, and the corresponding part of the strip bears the letters or characters that are of the width of an "m," while the portion $2^g$ of the rib below $2^f$ tapers off to a point and corresponds with a part of the strip that bears no characters. There is an incline between $2^b$ and $2^c$ and between $2^d$ and $2^e$ to avoid a sharp angle.

Figures 2, 3:
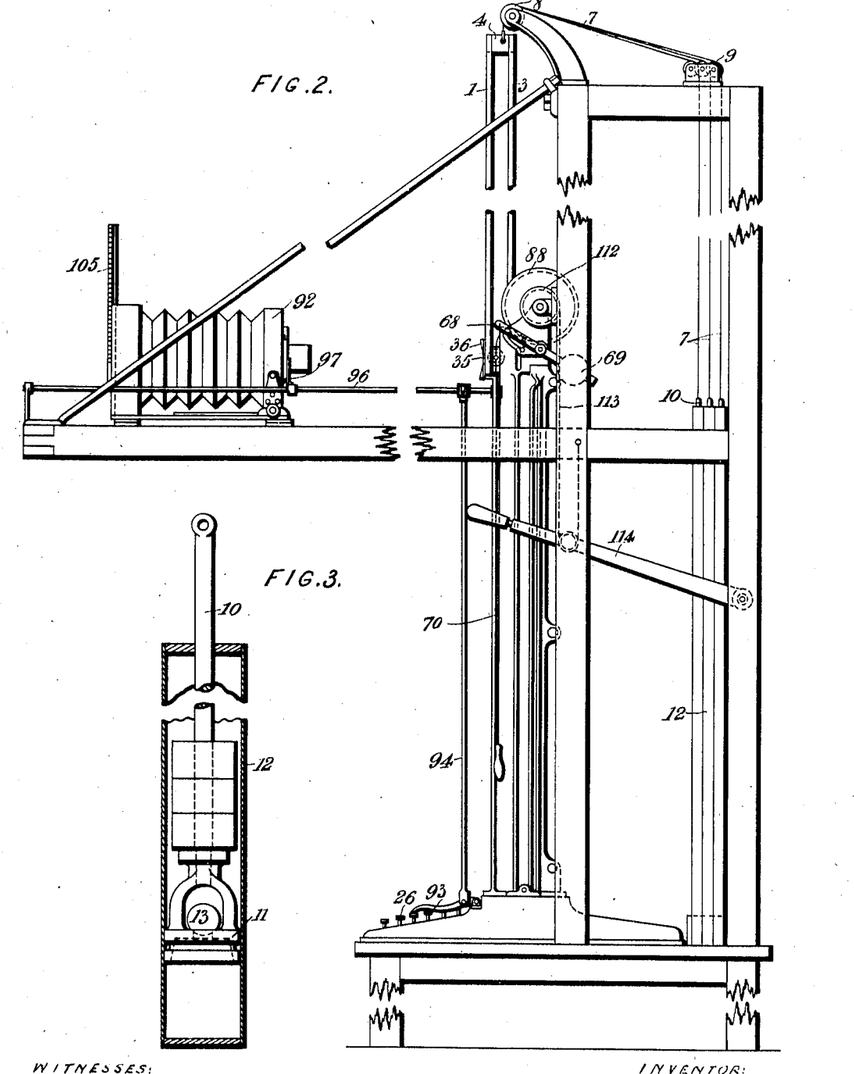

Every strip 1 is connected at the upper end to a corresponding vertical guide-bar 3, the connection 4 being somewhat flexible, so as to allow the strip to move slightly sidewise relatively to the guide-bar. The guide-bars 3 pass through guides 5 5 in the frame of the apparatus and are normally held up together with the strips 1 1 by means of the stops 6 6, hereinafter described. To the tops of the guide-bars 3 are connected cords or chains 7, one to each guide-bar. These cords pass over pulleys 8 8 and 9 9 and are connected at their other ends to the rods 10 of weighted plungers 11, (see Fig. 3,) which move in dash-pots or cylinders 12, which may or may not contain water. Each plunger 11 fits the cylinder 12 somewhat easily and is provided with a ball-valve 13. The strips 1 and their guide-bars 3 are slightly heavier than the plungers 11 with their weights, so that the strips 1 and guide-bars 3 will descend in the grooves 30 in the plate 15 when the corresponding stops 6 6, which hold them up, are withdrawn, as hereinafter described. Too sudden a descent of the strips is prevented because while a strip descends and the corresponding weighted plunger 11 rises the valve 13 closes and the plunger acts as a kind of brake, as a partial vacuum is produced below it while it rises. On the other hand, when the strips are again pushed up to their normal position, as hereinafter described, the valves 13 open and the strips can therefore rise quickly.

As has been already stated, every strip is normally held up by a stop 6. Below each of these stops is a vertical row of other stops 14 14 in vertical grooves 30 in the plate 15. The number of stops 14 in each of these grooves 30 corresponds with the number of characters on a strip 1—say seventy, for example. Consequently if there are forty strips there would be forty grooves 30, furnished with stops 14, each groove containing seventy stops. The stops 14 are fitted in holes in the backs of the grooves 30 of the fixed plate 15 and are free to be moved so as to interrupt the falling of the guide-bar 3 or to be withdrawn, and they are normally in the withdrawn position seen in Fig. 5. Behind the fixed plate 15 is a carriage 16, which is moved intermittently and horizontally, as hereinafter described. In this carriage is a single vertical row of holes equal in number to the stops 14 in one vertical row, and in these holes are fitted spring-pushers 17, at the same height, respectively, as the stops 14. Behind the carriage 16 is a set of horizontal push-bars 18, extending across the machine, there being one of these bars on the same level as each pusher 17 and as every horizontal row of the stops 14. Every push-bar 18 is connected by two arms 19 to a corresponding horizontal shaft 20, which is free to turn on its axis, and every shaft 20 has keyed to it a tailpiece 21. Every tailpiece 21 is connected by a rod 22 with a corresponding key-bar 23, pivoted at 24 and kept up to its normal position by a spring 25. Every key-bar is fitted with a corresponding key 26, as in a type-writing machine. If there are seventy characters on a strip 1, and consequently seventy stops 14 in each vertical row, there will be seventy push-bars 18, seventy horizontal shafts 20, seventy key-bars 23, and seventy keys 26. The key-bars 23 are all in contact with the horizontal bar 27, and this bar is connected near its ends by means of rods 28 with tailpieces 29, keyed to a shaft 31, which is free to turn on its axis. To the shaft 31 are keyed levers or arms 32, the upper ends of which are attached to a pull-bar 33. This pull-bar engages with the back part of a hook-piece 34, which is free to move horizontally in a guide in the carriage 16. The front part of the hook-piece engages in its turn with a flange on the particular stop 6 which for the time being is in line with it. Whenever any one of the key-bars 23 is depressed by means of the corresponding key 26, the corresponding rod 22 pulls down the tailpiece 21, the shaft 20 is thereby turned, and the corresponding push-bar 18 moved forward, so that the corresponding pusher 17 is acted upon and pushes out the corresponding stop 14 into the groove 30—viz., to the position of the lower stop 14 in Fig. 6. The particular stop 14 acted upon depends, so far as a vertical row of these stops is concerned, upon the particular key 26 that has been depressed, while the particular stop 14 acted upon depends, so far as a horizontal row of these stops is concerned, upon the position for the time being of the carriage 16, and consequently of the vertical row of pushers 17 in the carriage. The depression of the key-bar, in addition to causing the protrusion of the proper stop 14, as just explained, has a further effect—namely, it depresses (no matter which of the key-bars 23 it is) the horizontal bar 27, so that through the intermediation of the rods 28, the tailpieces 29, shaft 31, levers 32, pull-bar 33, and hook-piece 34 the particular stop 6 which for the time being is engaged by this hook-piece is withdrawn. The result is that the corresponding guide-bar 3 is released and at once begins to descend in its guides 5 and in the groove 30, together with the strip 1, and the descent continues until arrested by the stop 14 which has been protruded. The distance to which the strip 1 descends brings the letter or character thereon corresponding with the key that has been depressed into the line for printing, this line being behind a horizontal slot 35 in a plate 36, fixed to the front of the apparatus. For every depression of any one of the key-bars 23 the carriage 16 traverses a distance sufficient to bring its rows of pushers 17 behind the next vertical row of stops 14, so that on the next depression of any key-bar the next strip 1 in succession may be released and descend to the required position. It will thus be readily understood that if it be required to set up or compose the word "Greene," for example, it is only necessary to depress in succession the keys 26, corresponding, respectively, with the letters "G," "r," "e," (twice,) "n," and "e." The first six strips will descend the respective distances to bring these six letters in line behind the slot 35. It will be understood that it is not necessary to wait after each depression of a key for the strip to descend to its required position, as the keys may be depressed in succession very rapidly and the strips descend slowly, several being in movement at the same time.

Figure 4:
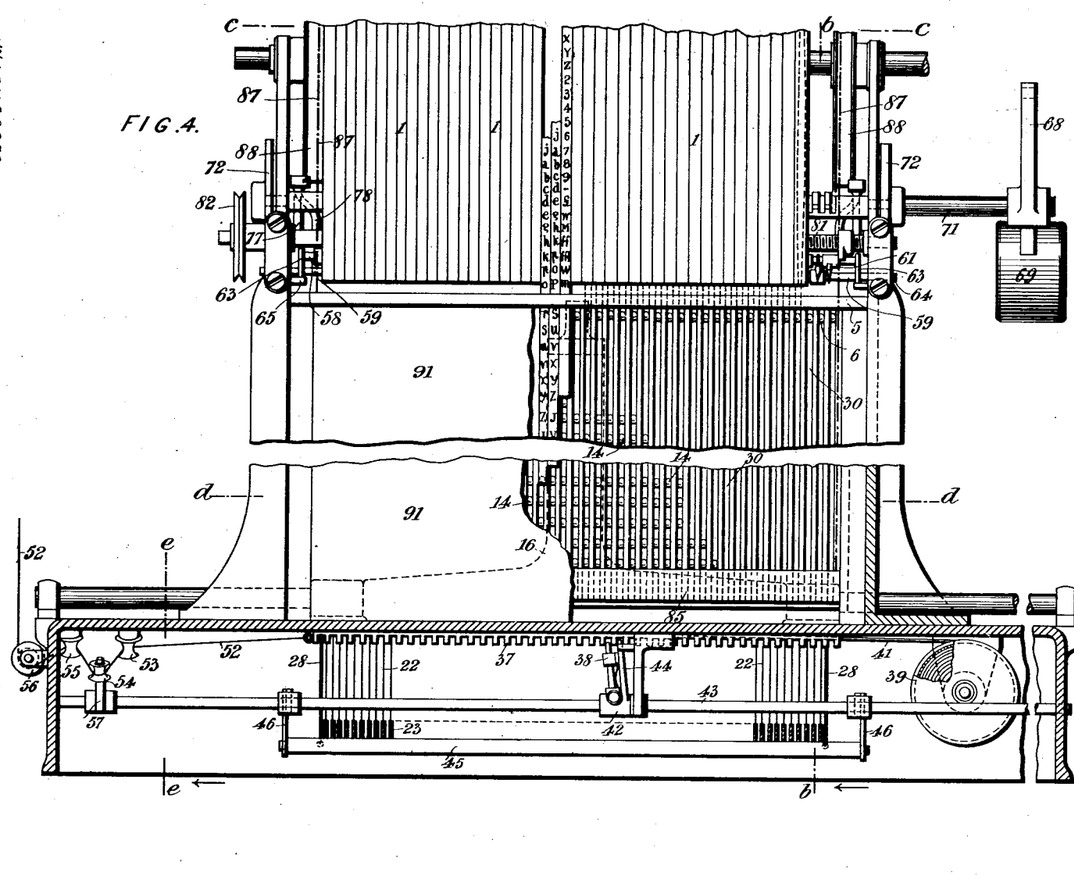
Fig. 4 is a front elevation of the type-setting mechanism, partly in section, on the line $a\ a$ of Fig. 5, the slotted plate 36 being removed and part of the front plate 91 being broken away to allow the parts behind to be seen and three of the type-strips being seen in their lowered position.

The intermittent traversing movement of the carriage 16 is effected as follows: On the carriage is a rack 37, with which a spring-catch 38 normally engages, while a spring-barrel 39 tends to pull the rack 37 and carriage 16 by means of the cord 41. The spring-catch is pivoted to a boss 42, but the extent of its pivoting movement is limited. The boss 42 is mounted on a shaft 43, which is free to turn on its axis to a certain extent. On the boss 42 is fixed another catch 44, and the catch 38 is normally behind the catch 44. When any one of the key-bars 23 is depressed, it pushes down a horizontal bar 45. Links 46 connecting this bar to arms 47 on the shaft 43 consequently give a partial rotation to this shaft. The catches 38 and 44 move with the shaft, and as they do so the catch 38 moves clear of the rack 37, while the catch 44 engages with the rack before the catch 38 is quite free. The rack is therefore still held. The catch 38 immediately it is clear of the rack is forced by its spring into the position seen in Fig. 4—that is to say, opposite the next tooth of the rack. Then after the pressure of the key-bar, and consequently on the bar 45, is removed the bar 45 and shaft 43 return to their normal position, their return being insured by one or more springs 48. During this movement the catch 44 leaves the rack; but before it does so the catch 38 engages with the next tooth. The spring-barrel 39 then draws the rack 37 and carriage 16, the force of the spring of the catch 38 being overcome; but as during this movement the catch 38 has to turn on its pivot the extent of the movement is limited and is in fact equal to the distance of one tooth of the rack, and this distance is equal to that between two of the vertical rows of holes 14.

Figures 5, 6:
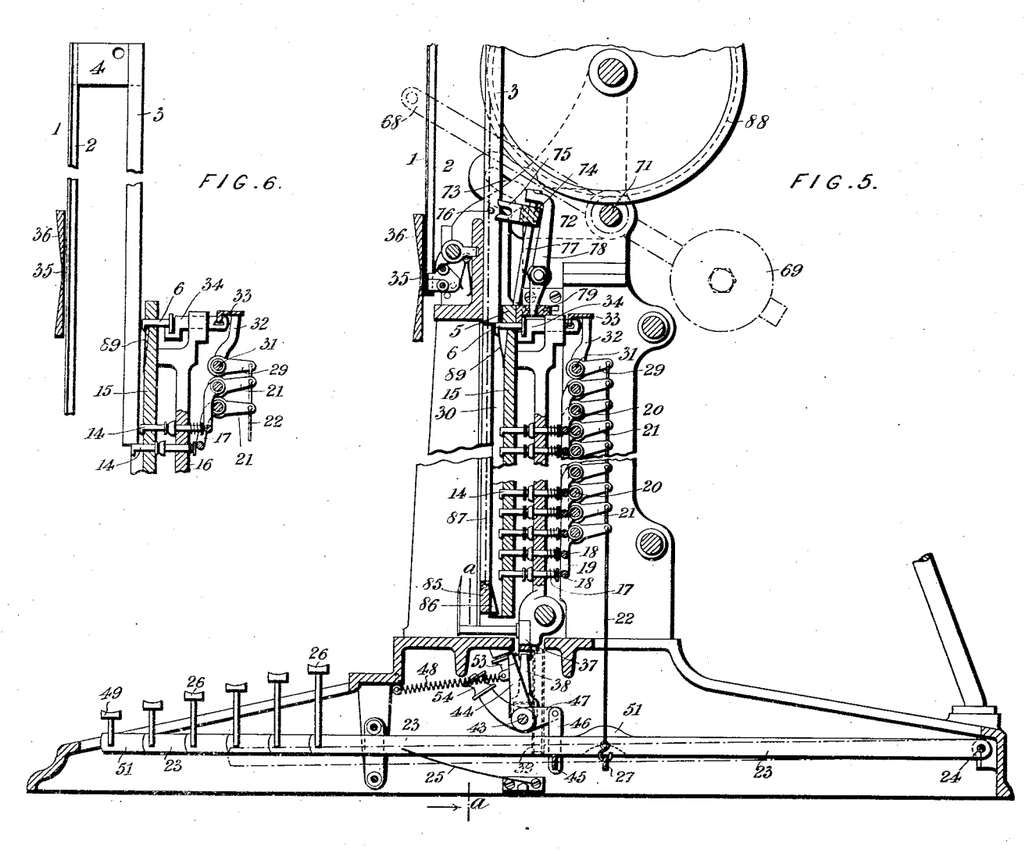
Fig. 5 is a section on the line $b\ b$ of Fig. 4.
Fig. 6 is a detail view of one of the strips 1 and adjacent parts after it has been released, allowed to fall, and arrested at the required letter or other character.
Figure 7:
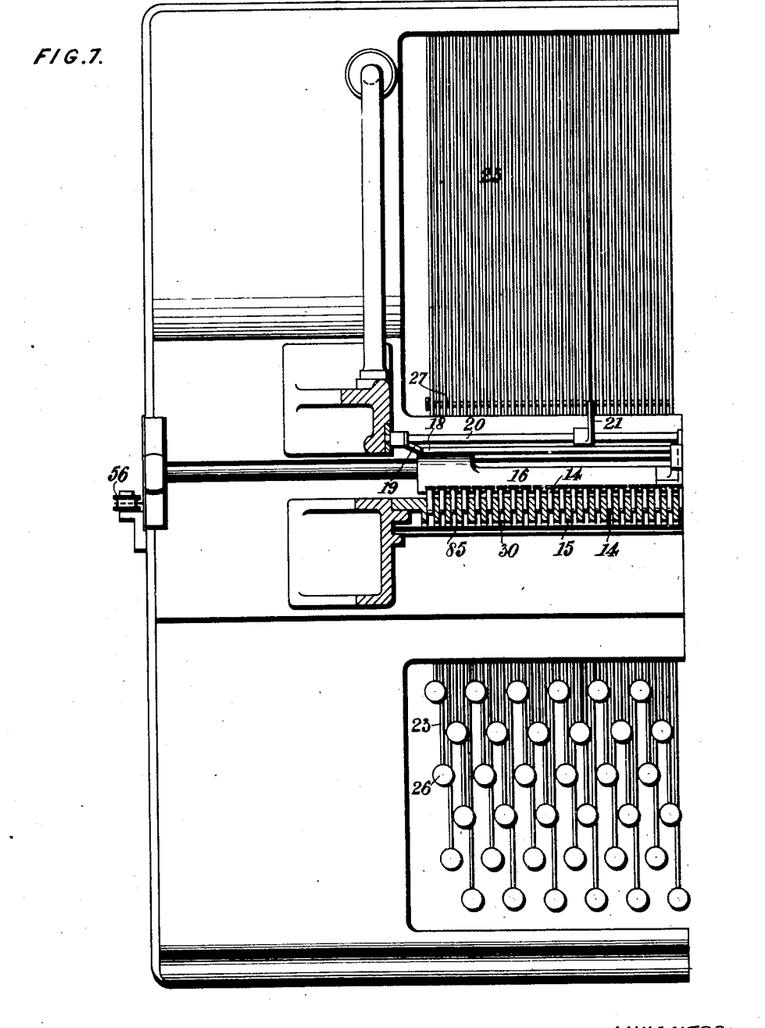
Fig. 7 is a horizontal section of the left-hand half, and Fig. $7^a$ a horizontal section of the right-hand half, of the type-setting mechanism, Fig. 7 being on the line $d\ d$ of Fig. 4, and Fig. $7^a$ on the line $c\ c$ of Fig. 4.
Figure 7A:
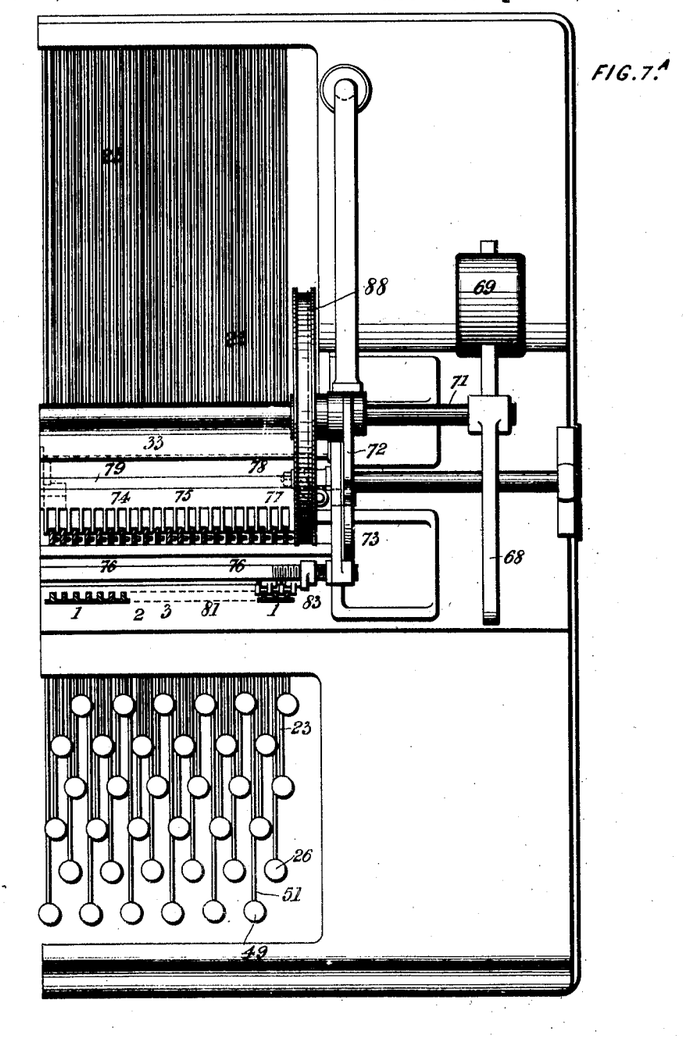
Figure 8:
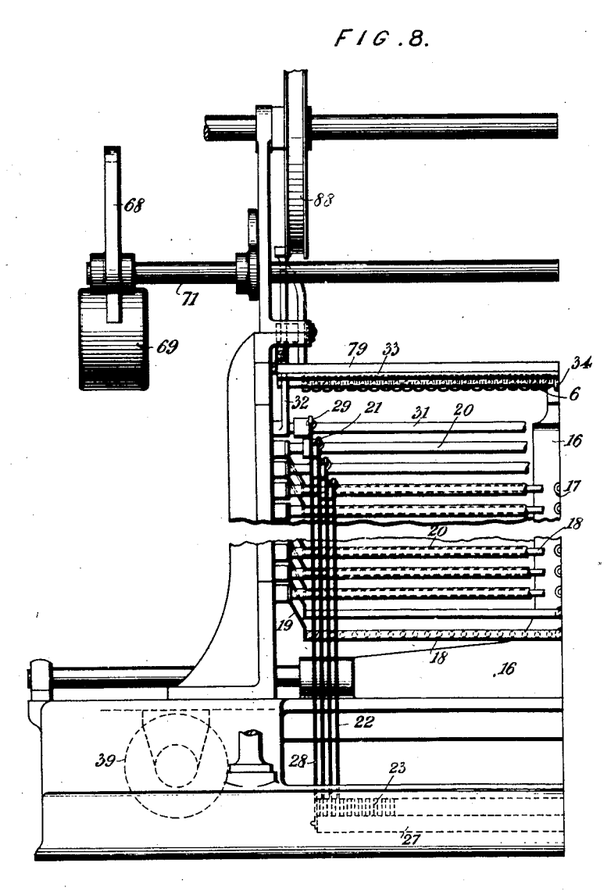
Fig. 8 is a back elevation of the type-setting mechanism.
Figure 9:
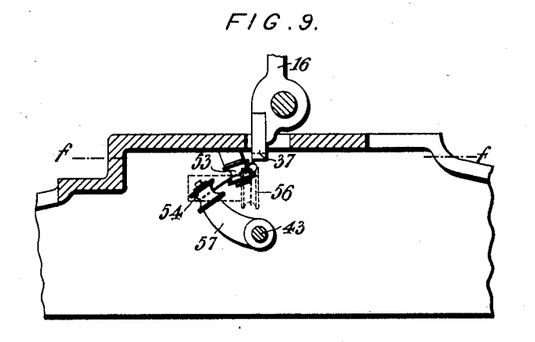
Fig. 9 is a section on the line $e\ e$ of Fig. 4, showing the mechanism for putting the catches 38 and 44 out of gear with the rack 37 and drawing back the traveling carriage.
Figure 10:
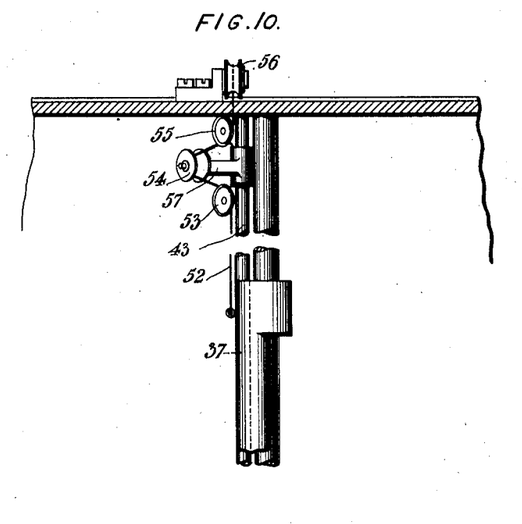
Fig. 10 is a section on the line $f\ f$ of Fig. 9.

When a word has been composed and it is required to provide for a space before the next following word, this could be accomplished by having one or more sections of each strip allotted for one or more spaces of different widths and by bringing these space-sections into line in the same way as the letters or characters, as will be well understood. It is preferred, however, to pass over a strip without acting upon it when a space is required, the traversing movement of the carriage being nevertheless effected as before. The strips thus passed over are caused to descend as hereinafter described when the line of characters has been completed. In order to produce the traversing motion of the carriage without acting on a strip, there is a separate key 49 and key-bar 51, which act upon the horizontal bar 45, from which the traversing movement is effected, but do not act upon the horizontal bar 27, from which the release of the stops 6 is effected. The key-bar 51 is cranked, as seen in Fig. 5, so as to pass clear above the bar 27, so that when depressed it does not touch this bar.

When after the completion of a line it is required to return the carriage 16 to the starting position, this is effected by pulling the cord 52, attached to the rack 37. This cord passes around the pulleys 53, 54, 55, and 56. The pulley 54 is placed somewhat askew with respect to the pulleys 53 and 55 and is carried by an arm 57, keyed on the shaft 43, the consequence of which is that when the cord 52 is pulled the pulley 54 and arm 57 become first moved, so that the pulley 54 gets more in line with the pulleys 53 and 55, and the shaft 43 is thereby turned sufficiently on its axis to move both the catches 38 and 44 clear of the rack. Then the continued pulling of the cord has the effect of pulling the rack 37 and carriage 16, the cord 41 unwinding from the spring-barrel 39 and winding up the spring of same.

Figure 11:
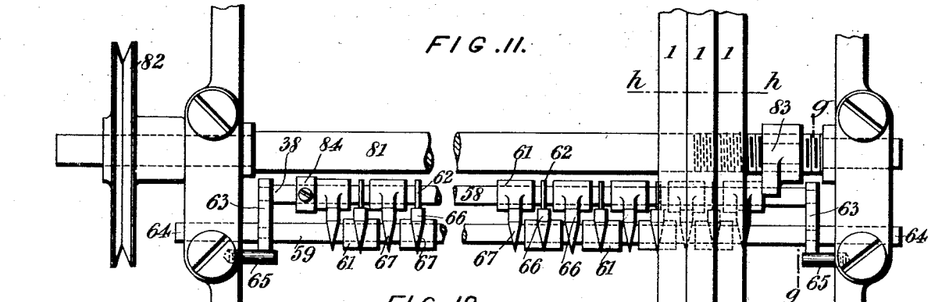
Fig. 11 is a front elevation of the mechanism for "justifying" and for locking up a line after it has been set up or composed.
Figure 12:
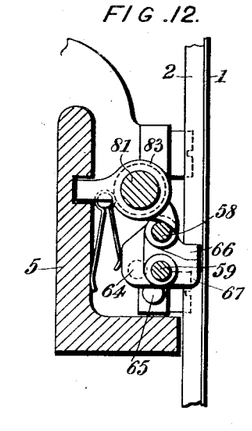
Figs. 12 and 13 are sections on the lines $g\ g$ and $h\ h$, respectively, of Fig. 11.
Figures 16, 17:
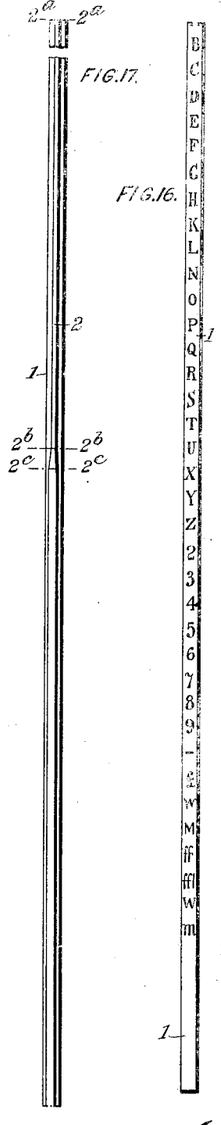
Figure 17:
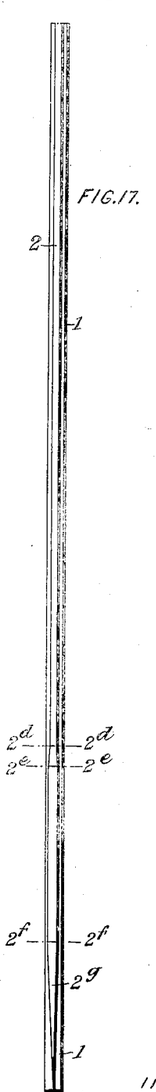

When all the letters or characters which go to make up a line have been set up or composed, it becomes necessary to produce the spaces between the words to justify the line and to lock it up. These objects are effected as follows: Upon two parallel bars 58 and 59 are loosely mounted a series of collars 61, which are placed alternately on the said two bars. The collars that are on the lower bar 59 have rings 62, which are slipped on the upper bar 58 to serve as guides to the collars. The two bars are connected together by end pieces 63 63, which are free to turn on the pivots 64 64 in the side frames, as best seen in Fig. 11. 65 65 are stops to limit the movement of the end pieces 63 with the bars 58 and 59. Each of the collars 61 on these bars has a projecting rectangular part 66, continued downwardly by a tapered part 67. The ribs 2 on all the strips 1, whether in their raised position or when lowered, pass between the respective square parts 66, as seen best in Fig. 13; but as regards the strips that have not been lowered it is the narrowest part of the ribs at their lower end that is between the parts 66. These non-lowered strips must now be lowered, and the extent to which they are lowered so as to bring a greater or less width of the tapered part $2^s$, Fig. 17, of the rib into play regulates the definite width of the spaces, and consequently effects the "justification" of the line. The lowering of these non-lowered strips and the extent of their descent is effected by means of a lever 68, with counterweight 69, and fitted with a pull-rod 70. This lever is mounted on a shaft 71, extending across the apparatus and carrying near each end a plate 72 with cam-groove 73. In these grooves are the ends of a horizontal bar 74, formed with a number of forks 75, situated, respectively, behind an equal number of studs 76 on the guide-bars 3 of the strips. Passing through the bar 74 near its ends are guide-pins 77, fixed to the upper ends of levers 78. The lower ends of the levers engage in holes in a sliding catch-bar 79, which engages behind flanges on all the stop-pins 6. When the lever 68 is pulled down, together with the cam-plates 72, the cam-grooves first cause the bar 74 to move forward until the forks 75 engage with the studs 76 of all the guide-bars 3 that have not been lowered. Meanwhile as the upper ends of the levers 78 have been moving forward with the bar 74 their lower ends have been moving backward and drawing back the sliding catch-bar 79, and the stops 6 are thus drawn clear of the non-lowered bars 3. These guide-bars then descend under the control of the forks 75, the fork-bar 74 moving down the guide-pins 77. The extent of the descent is governed by the distance to which the lever 68 is pulled down, and this will depend upon the judgment of the operator, who, after a little experience, will know how much justification to provide for. Any error of justification will become evident after the locking-up operation, hereinafter described, and can be corrected.

The line having been justified, it has now to be locked up. This is effected by rotating the shaft 81 by means of a cord or chain passed over the pulley 82. The shaft 81 is screw-threaded near one end and carries a nut 83, which as the shaft rotates moves toward the opposite end, and in so doing it presses against the nearest of the collars 61 and through it upon all the other collars 61, pushing them all toward a fixed stop 84 at the other end of the bar 58. During this movement of the collars they come as close together as the ribs 2 between the square parts 66 will permit. Consequently whenever the rib is of "l" width or of "n" width (see Fig. 13, in which the rib at the left is of "l" width, that in the middle of "n" width, and that at the right of "m" width) the squares 66 at the two sides are pushed closer together, so as to come against the rib, while the rib itself is pushed nearer the neighboring ribs, the corresponding strips 1 becoming proportionately overlapped. This sidewise movement of the strips is permitted by the flexibility of the connection 4 at top.

Although I have described the operations of justifying and locking up as being effected separately, they can be effected simultaneously.

When the line has been locked up, it is photographed, as hereinafter described. The line is then unlocked by rotating the shaft 81 in the opposite direction. Then the strips must all be raised to their normal position, and the stops 14, which have been protruded, must be pushed back, so that the apparatus may be ready for setting up a fresh line, the carriage 16 being also returned to the starting-point. The raising of the strips 1 and the pushing in of the protruding stops 14 is effected by means of a transverse bar 85, having a series of inclined projections 86, which engage in the grooves 30 of the fixed plate 15. The bar 85 is raised by means of cords 87, passing over pulleys 88, and as it rises the inclines 86 push in the protruding stops 14, and the bar itself pushes up all the guide-bars 5 and strips until they have passed the upper stops 6, which are then immediately pushed out by springs 89, so as to prevent the descent of the bars. In the upward movement of the strips the parts of "m" width of the ribs 2 get in line and are liable to jam with the square parts 66; but jamming is obviated because the bars 58 and 59 yield by turning upward on the centers 64, the effect of this being that the square parts 66 temporarily move clear of the ribs 2, their places being taken by the tapered parts 67.

The front of the type-composing apparatus between the keys 26 and the strips 1 may be inclosed by a plate 91; but this is not essential.

Figure 1:
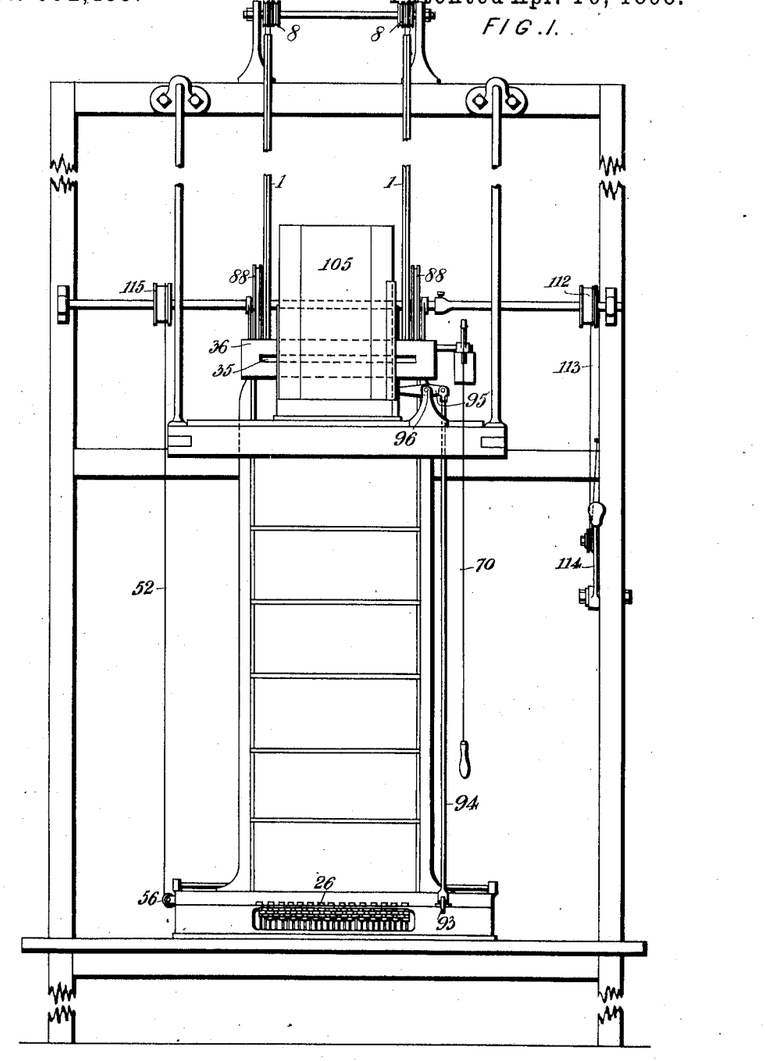
Figure 1 is a front elevation, and Fig. 2 a side elevation, of the whole apparatus.

The shaft of the pulleys 88, over which the cords 87 for lifting the bar 85 pass, is driven by means of the pulley 112 thereon, this pulley being itself driven by a chain or cord 113, worked by a hand-lever 114. (See Fig. 2.) On the same shaft is another pulley 115, Fig. 1, to which is connected the cord 52, by means of which the rack 37 is returned to its starting position, as previously described. Therefore the pulling down of the lever 114 lifts the bar 85 and also returns the rack 37 and carriage 16 to the starting position.

Figure 14:
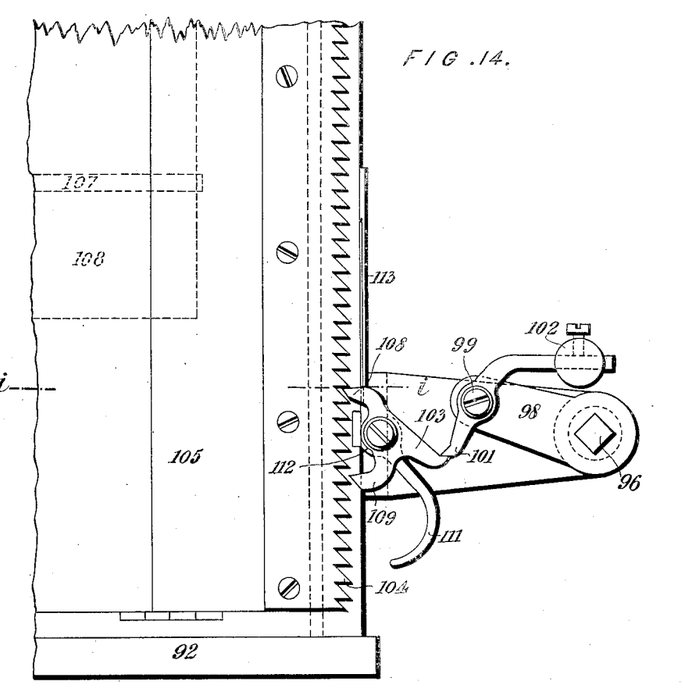
Fig. 14 is a back elevation of part of the camera, showing the mechanism for moving the photographic plate or film intermittently.
Figure 15:
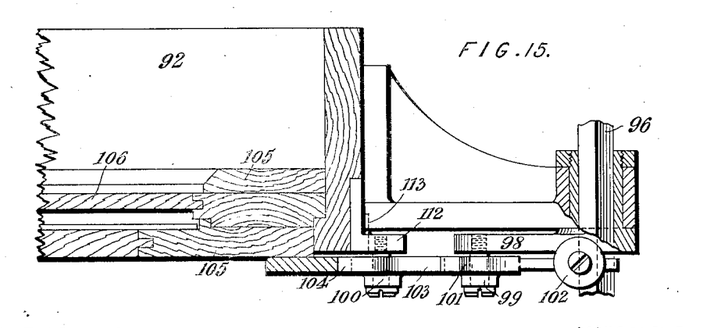
Fig. 15 is a section on the line $i\ i$ of Fig. 14.

I will now describe the apparatus for taking a photographic negative of the line of type and for moving the photographic plate intermittently after each exposure, so as to be ready for taking a negative of the next line after this has been set up. Opposite the slot 35 in the plate 36 I place a camera 92, the distance of which from the plate 36 can be varied as desired. At the side of the set of keys 26 is a hinged finger-piece 93, Figs. 1 and 2, to which is connected the lower end of a rod 94, whose upper end is connected to an arm 95, keyed on a horizontal rod 96, so that when the finger-piece 93 is depressed the rod 96 is caused to make a partial axial revolution. Attached to the rod 96 is an arm 97, which as the rod makes its partial revolution in the one direction actuates the shutter of the camera and thereby causes an exposure. The arm 97 is adjustable along the rod 96, so that it can slide along it according to the position of the camera. Farther along the rod 96 is an arm 98, (see Figs. 14 and 15,) to which is pivoted at 99 a tappet 101 with a weight 102. This tappet as the rod 96 turns on its axis actuates an escapement 103, which is pivoted at 100 and engages with a notched bar or rack 104, fixed to the slide 105, that carries the photographic plate 106. The slide 105 has a slot 107 in the same plane as the slot 35 of the composing apparatus and of width varying in different slides and depending upon the size to which the line of printing is to be reduced. The slide 105 is normally held up by the upper catch 108 of the escapement, its lower catch 109 being normally out of engagement. When a line of type has to be photographed, the finger-piece 93 is depressed, and the rod 96 therefore makes a partial revolution. This causes an exposure, owing to the arm 97 actuating the shutter. In the same partial revolution of the rod 96 the arm 98 rises with the tappet 101, and the nose of the tappet, which was below the tail of the escapement 103, comes against the tail, and by turning on its pivot it passes the tail, but is at once brought above the tail by the action of the weight 102. Then when the finger-piece 93 is freed the rod 94 descends by reason of its own weight and the rod 96 makes a partial revolution in the reverse direction. In this movement the tappet 101 pushes down the tail of the escapement, so that the upper catch 108 is withdrawn from the rack 104, while the lower catch 109 is temporarily pushed in. The weight of the notched bar and slide then comes upon this catch 109 and pushes it downward, thereby causing the escapement to turn on its pivot 100, the tappet 101 being now clear of the escapement. The upper catch 108 therefore again enters the rack one tooth above that with which it last engaged, while the lower catch 109 moves again clear of the rack. The rack has therefore descended together with the slide 105 and photographic plate 106 to the extent of one tooth of the rack, the plate 106 being now in position to photograph a negative of the next line of type. When it is required to remove or insert the slide 105, both catches of the escapement can be held clear of the notches by pulling outward the finger-piece 111, which is attached to the boss 112, carrying the pivot 100. This boss is carried on the lower end of a spring-plate 113, secured at its upper end to the side of the camera, as shown, so that when the finger-piece 111 is pulled outward it moves the escapement entirely clear of the notches.

If the strips 1 1 are black and the letters or characters thereon white, as hereinbefore described, the photographic negative obtained therefrom will be a transparency—that is to say, the letters or characters will be dark upon a transparent ground. If, however, the strips be white and the characters black, the characters in the negative will appear transparent on a dark ground.

What I claim, and desire to secure by Letters Patent, is—

1. In a machine for the composition of letters or characters into words or the like and having a number of movable character-bearing strips released successively from holding-up stops and arrested at the required heights by arresting-stops as set forth, the combination with such strips, and arresting-stops, of separately-movable holding-up stops, an engaging piece 34 withdrawing said holding-up stops successively, keys 26 representing the different characters, key-bars 23 operated by said keys, horizontal bar 27 with which the said key-bars are in contact, and connections between said horizontal bar and the engaging piece 34, whereby whenever any one of said keys 26 is operated the corresponding key-bar 23 depresses the horizontal bar 27 and the engaging piece 34 is pulled and withdraws the stop 6 with which it is for the time being engaged, substantially as and for the purpose set forth.

2. In a machine for the composition of letters or characters into words or the like and having a number of movable character-bearing strips released from holding-up stops and arrested at the required heights by arresting-stops and having a set of keys and key-bars by means of which said holding-up stops and arresting-stops are operated and having also a traversing carriage which moves from one vertical row of arresting-stops to the next row of said stops at every manipulation of any of said keys, substantially as set forth, the combination with said keys, key-bars, holding-up stops, arresting-stops, and traversing carriage, of a "space-key" and corresponding key-bar inactive relatively to said holding-up stops, and the depression of which effects the feed of said traversing carriage but does not act upon any holding-up stop or any arresting-stop whereby one of the movable strips remains in its normal position substantially as and for the purpose set forth.

3. In a machine for the composition of letters or characters into words or the like and having a number of movable character-bearing strips released from holding-up stops and arrested at the required heights by arresting-stops and having a set of keys and key-bars by means of which said holding-up stops and arresting-stops are operated and having also a traversing carriage which moves from one vertical row of arresting-stops to the next row of said stops at every manipulation of any of said keys and having also a "space-key" and corresponding key-bar inactive relatively to said holding-up stops, and the manipulation of which effects the feed of said carriage but does not act upon any holding-up stop or any arresting-stop substantially as set forth, the combination with the movable character-bearing strips and said holding-up stops separately movable of means for simultaneously withdrawing all the holding-up stops that have not been withdrawn and simultaneously lowering the corresponding strips to any required extent whereby "spaces" are introduced between the words and the line is justified, substantially as and for the purpose set forth.

4. The combination with a machine for composing a line of letters or characters by means of a number of character-bearing strips which are moved into the respective positions to bring into alinement the characters required to make up a line, substantially as set forth, of a camera facing said machine and having its object-glass at the same height as that in which the line of characters is composed in said machine, a hand-operated device on said machine and connections between said device and said camera whereby when said device is operated the shutter of the camera is moved and causes an exposure, and the photographic plate or film is then moved and its next section thereby brought into line with the said slot substantially as and for the purpose hereinbefore described.

In witness whereof I have hereunto signed my name in the presence of two subscribing witnesses.

WILLIAM FRIESE-GREENE.

Witnesses:
GEORGE C. BACON,
ROBERT M. SPEARPOINT.